(12) United States Patent
Goel et al.

(10) Patent No.: US 11,568,869 B2
(45) Date of Patent: Jan. 31, 2023

(54) LOW LATENCY AUTOMATED IDENTIFICATION OF AUTOMATED ASSISTANT FUNCTION FAILURE

(71) Applicant: Google LLC, Mountain View, CA (US)

(72) Inventors: Aakash Goel, Mountain View, CA (US); Tayfun Elmas, Sunnyvale, CA (US); Keith Brady, Dublin (IE); Akshay Jaggi, New Delhi (IN); Ester Lopez Berga, Dublin (IE); Arne Vansteenkiste, Dublin (IE); Robin Martinjak, Dublin (IE); Mahesh Palekar, Mountain View, CA (US); Krish Narang, Mountain View, CA (US); Nitin Khandelwal, Sunnyvale, CA (US); Pravir Gupta, Los Altos, CA (US)

(73) Assignee: GOOGLE LLC, Mountain View, CA (US)

( * ) Notice: Subject to any disclaimer, the term of this patent is extended or adjusted under 35 U.S.C. 154(b) by 144 days.

(21) Appl. No.: 17/102,408

(22) Filed: Nov. 23, 2020

(65) Prior Publication Data
US 2022/0165259 A1 May 26, 2022

(51) Int. Cl.
*G10L 15/22* (2006.01)
*G10L 15/08* (2006.01)

(52) U.S. Cl.
CPC .............. *G10L 15/22* (2013.01); *G10L 15/08* (2013.01); *G10L 2015/088* (2013.01); *G10L 2015/223* (2013.01); *G10L 2015/228* (2013.01)

(58) Field of Classification Search
None
See application file for complete search history.

(56) References Cited

U.S. PATENT DOCUMENTS

| | | | |
|---|---|---|---|
| 9,058,424 B1 * | 6/2015 | Bienkowski | G06F 11/3668 |
| 10,354,011 B2 * | 7/2019 | Nell | G06F 3/167 |
| 10,490,187 B2 * | 11/2019 | Laurens | G06F 3/167 |
| 11,114,087 B1 * | 9/2021 | Leslie | G10L 15/20 |

(Continued)

*Primary Examiner* — Seong-Ah A Shin
(74) *Attorney, Agent, or Firm* — Gray Ice Higdon

(57) ABSTRACT

Implementations include identifying, from a database of entries reflecting past automated assistant commands submitted within a threshold amount of time relative to a current time, particular entries that each reflect corresponding features of a corresponding user submission of a particular command. Further, those implementations include determining that the particular command is a golden command, for a particular automated assistant function, responsive to determining that: at least a threshold percentage of the user submissions of the particular command triggered the particular automated assistant function, and a quantity of the user submission of the particular command satisfies a threshold quantity. Those implementations further include, responsive to determining that the particular command is currently the golden command: processing a stream of current occurrences of submissions of the particular command to determine whether the particular automated assistant function is triggered; and when the processing indicates that a threshold quantity and/or percentage of the current occurrences fails to satisfy a potential problem threshold: causing one or more electronic alerts to be transmitted.

20 Claims, 4 Drawing Sheets

(56) References Cited

U.S. PATENT DOCUMENTS

| | | | |
|---|---|---|---|
| 11,158,308 B1* | 10/2021 | Bissell | G10L 15/22 |
| 11,437,026 B1* | 9/2022 | Roshan Ghias | G10L 15/22 |
| 2015/0067553 A1* | 3/2015 | Grieve | G06F 3/04842 |
| | | | 715/765 |
| 2020/0081751 A1* | 3/2020 | Verweij | G06F 9/4837 |
| 2022/0165259 A1* | 5/2022 | Goel | G06F 3/167 |

* cited by examiner

LOW LATENCY AUTOMATED IDENTIFICATION OF AUTOMATED ASSISTANT FUNCTION FAILURE

BACKGROUND

Humans can engage in human-to-computer dialogs with interactive software applications referred to herein as "automated assistants" (also referred to as "digital agents," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text and then processed, by providing textual (e.g., typed) natural language input, and/or through touch and/or utterance free physical movement(s) (e.g., hand gesture(s), eye gaze, facial movement, etc.). An automated assistant responds to a request by providing responsive user interface output (e.g., audible and/or visual user interface output), controlling one or more smart devices, and/or controlling one or more function(s) of a device implementing the automated assistant (e.g., controlling other application(s) of the device).

Automated assistants can be installed at a variety of different devices such as, for example, mobile phones, smart home devices, and/or vehicles. Automated assistants can have different capabilities based on the devices they are installed on, invoked on, or commanded to perform actions on. Automated assistants can receive software updates (client-side and/or server-side) to their functionality and natural language understanding models over time, which may vary based on the device on which the automated assistant is installed. Automated assistants may also be configured to interact with various third-party services and applications running on different platforms, and those third-party services, applications, and platforms may themselves receive functional updates at various times. These various device-dependent capabilities and/or software updates can result in unintended changes in the automated assistant functionality.

SUMMARY

Implementations disclosed herein are directed to determining, with low latency, when there is a potential problem with any one of multiple automated assistant functions. Problem(s) with an automated assistant function can stem from various server-side and/or client-side updates. Those update(s) can include those that are specific to the automated assistant function and/or can include those that are more general in nature, such as updates to a natural language understanding (NLU) component of the automated assistant.

Some of those implementations are further directed to, when it is determined there is a potential problem with a given automated assistant function, causing electronic alert(s) to be transmitted to endpoint(s) that are assigned to the given automated assistant function. The electronic alert(s) can each indicate that there is a potential problem with the given automated assistant functions. Transmitting the electronic alert(s) can result in automatic and/or user-guided remediation(s) to eliminate or otherwise mitigate the potential problem with the given automated assistant function. In these and other manners, the duration of any problem with the given automated assistant function can be minimized, thereby mitigating (through minimization of the duration) occurrences of futile processing of associated requests for the assistant function and/or occurrences of errant processing of associated requests for the assistant function.

In various implementations, current associated golden command(s) are determined for each of multiple disparate automated assistant functions (e.g., stop alarm, set timer, adjust smart thermostat temperature, play music, etc.). The golden command(s) can be determined weekly, daily, every 72 hours, or at other regular and/or non-regular interval(s). For example, golden command(s) for each of multiple disparate automated assistant functions can be determined weekly, and can be determined based on past automated assistant commands submitted over the last week. A command for an automated assistant function can include term(s) (e.g., "stop", "play music") and/or other input(s) (e.g., a touch-free hand gesture, a touchscreen gesture), and optionally context (e.g., a device context that indicates the device is currently audibly rendering a timer). A command can be determined to be a golden command for the automated assistant function responsive to determining that it is frequent (e.g., submitted at least a threshold quantity of times over a given time period) and almost always (e.g., at least 90% of the time or other threshold percentage of the time) results in triggering of the automated assistant function. In those implementations, in determining whether there is a potential problem with any of multiple automated assistant functions, current golden commands can be analyzed in a live stream of submitted automated assistant commands from multiple users and multiple user devices. For example, each of the golden commands in the live stream can be analyzed and a potential problem with an automated assistant function can be determined responsive to determining that a threshold quantity and/or percentage of submission of one or more of the golden command(s) for the automated assistant function fails to trigger the automated assistant function, As one particular example, assume a particular command that includes the term "stop" (e.g., as determined from performing ASR or other acoustic analysis on an associated spoken utterance) and that also includes a device context of an end of timer notification being audibly rendered at an associated device that received the "stop" input from an associated user. The particular command can be determined to be a current golden command for a "stop timer" automated assistant function responsive to determining that, based on a database of entries reflecting recent automated assistant commands, the particular command is frequent and results in triggering of the "stop timer" automated assistant function at least 90% (or other threshold percentage) of the time it is submitted. In response to determining the particular command is a golden command for the "stop timer" automated assistant function, a live stream of current occurrences of that particular command can be analyzed in real-time. The current occurrences can be analyzed to determine whether their submissions result in initiating of the "stop timer" automated assistant function.

If, from the analysis, it is determined that a threshold quantity and/or percentage of the submissions do not result in initiating of the "stop timer" automated assistant function, electronic alert(s) can be automatically transmitted to endpoint(s) that are assigned to the given automated assistant function. For example, the electronic alert(s) can include email(s) transmitted to email address(es) assigned to the"stop timer" automated assistant function, text message(s) transmitted to phone number(s) assigned to the "stop timer" automated assistant function, and/or other electronic communication(s) transmitted to other endpoint(s) assigned to the"stop timer" automated assistant function. The endpoint(s) can be, for example, endpoint(s) associated with human(s) that oversee or are otherwise in control of the "stop timer" automated assistant function. The electronic alert(s) can, for example, each indicate there is a potential problem with the "stop timer" automated assistant function and/or with the particular command. In response to receiving the alert(s), the associated human(s) can work to quickly remediate the potential problem(s), if they are actual problem(s), thereby minimizing the duration of any actual problem(s).

In some implementations, instead of or in addition to transmitting the electronic alert(s), the particular automated assistant function can be automatically disabled for some (e.g., those in a particular geographic region or particular type(s) of devices) or all automated assistant devices. For example, the particular automated assistant function can be disabled responsive to determining that the quantity and/or percentage of submissions of the particular command that do not result in initiating the "stop timer" automated assistant function satisfies additional threshold(s) that are more stringent than the threshold(s) that result in the electronic alert(s) being automatically transmitted. The automated assistant function can remain disabled until human reviewer(s) manually clear the disabling of the automated assistant function. In these and other manners, errant processing of the particular command and/or other command(s) that initiate the particular automated assistant function can be avoided, thereby preventing potentially errant initiation of undesired alternate automated assistant function(s).

The above description is provided as an overview of only some implementations disclosed herein. These and other implementations are described in more detail herein, including in the detailed description and the claims.

DETAILED DESCRIPTION

Figure 1:
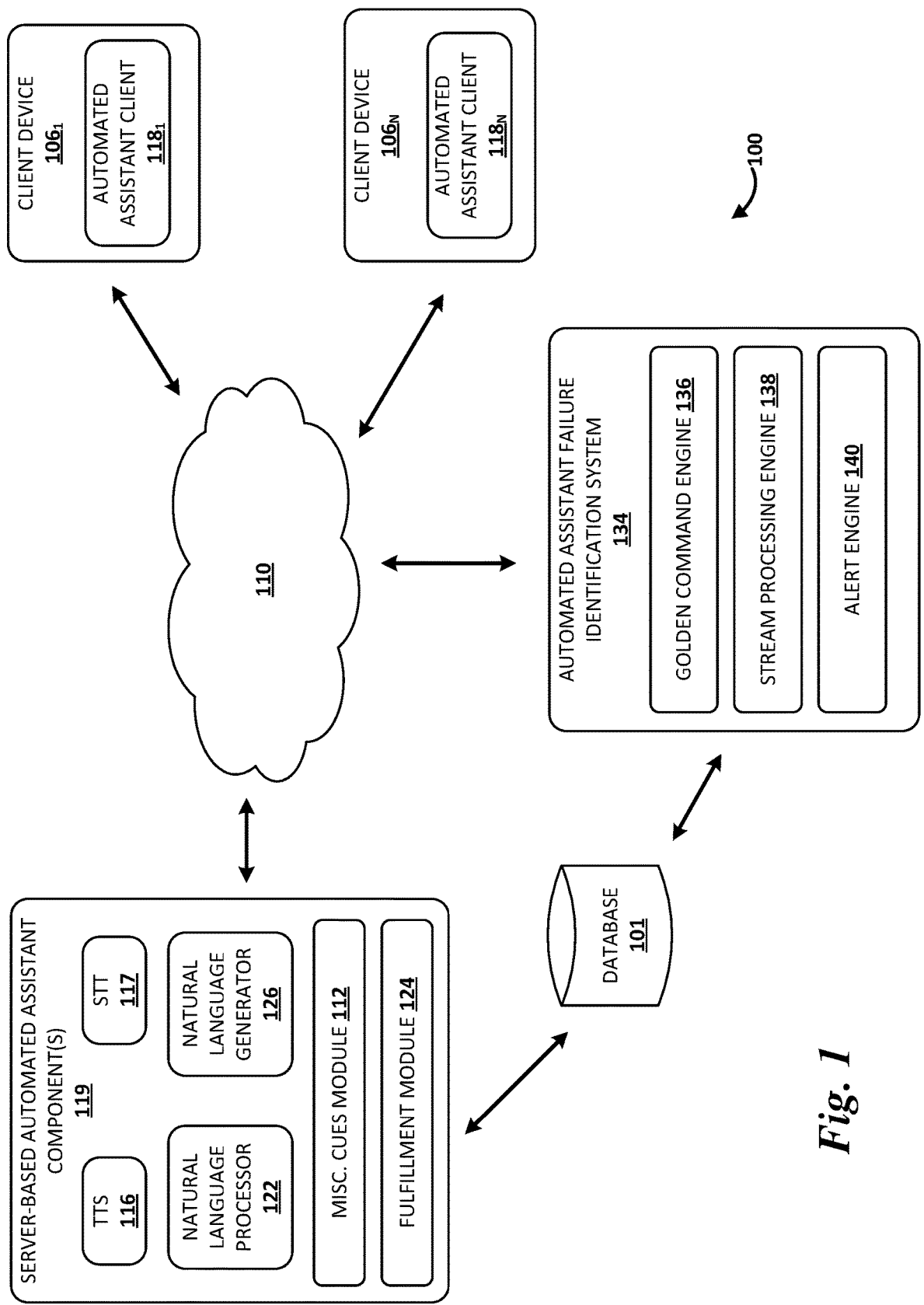
FIG. 1 is a block diagram of an example environment in which implementations disclosed herein may be implemented.

FIG. 1 depicts an example environment in which techniques disclosed herein may be implemented is illustrated. The example environment includes a plurality of client computing devices 1061 ꟷ N. Each client device 106 may execute a respective instance of an automated assistant client 118. One or more server-based automated assistant components 119 may be implemented on one or more computing systems (collectively referred to as a "cloud" computing system) that are communicatively coupled to client devices 106I-N via one or more local and/or wide area networks (e.g., the Internet) indicated generally at 110.

In various implementations, an instance of an automated assistant client 118, by way of its interactions with one or more cloud-based automated assistant components 119, may form what appears to be, from the user's perspective, a logical instance of an automated assistant with which the user may engage in a human-to-computer dialog. It should therefore be understood that each user that engages with an automated assistant client 118 executing on a client device 106 may, in effect, engage with his or her own logical instance of an automated assistant 120. For the sake of brevity and simplicity, the term "automated assistant" as used herein as "serving" a particular user will refer to the combination of an automated assistant client 118 executing on a client device 106 operated by the user and one or more cloud-based automated assistant components 119 (which may be shared amongst multiple automated assistant clients 118).

The client devices 1061:N may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a stand-alone interactive speaker (which may or may not be equipped with input/output devices such as microphones, cameras, speakers), and/or a wearable apparatus of the user that includes a computing device (e.g., a watch of the user having a computing device, glasses of the user having a computing device, a virtual or augmented reality computing device). Additional and/or alternative client computing devices may be provided.

As shown in FIG. 1, one or more of the server-based automated assistant component(s) 119 may contribute to or maintain a database 101 of entries of automated assistant functions performed in response commands issued by users. In some implementations, the database 101 may be a component of the server-based automated assistant 119 or may be hosted on one or more of the same computing systems of the server-based automated assistant components.

As used herein, a "command" refers to a user request for the automated assistant to perform some function. A "command" may include one or more terms provided by user input or determined based on user input (e.g., speech recognition, or other acoustic analysis), as well as other information that the automated assistant may use as input or during processing of commands to determine when/if to perform a function, what function to perform, and/or what parameters will be used in performing the function. Thus, a "command" may include past and current dialog states of the current human-to-computer dialog session, user settings, learned preferences of a user, information stored in or associated with a user profile, information about the client device 106 or other client devices associated with the user, and/or information characterizing an environment of the user and/or one or more of the client devices 106 associated with the user at or shortly before/after the time that the user submitted the command.

For example, users may provide spoken utterances of "stop" to the automated assistant while their client devices 106 are playing an alarm tone. In such an example, the "command" may include the term "stop" (or an acoustic representation thereof) and indications of: which of the client devices associated with the users were playing an alarm tone, which client devices 106 the users submitted the command to (which may be different than the client device playing the alarm tone), which alarms were set to trigger the alarm tones, which applications installed on the client devices 106 triggered the alarm tones, and any user settings or preferences affecting how an alarm should be "stopped" for that user (e.g., a slow decrease in volume, an immediate stop, a canceling of the alarm, or a resetting of the alarm).

Each entry in the database 101 may reflect an occurrence of a past user submission of a particular command to the automated assistant and a particular automated assistant function performed in response to or based on the particular command, as well as feature(s) of the occurrence including, but not limited to: date and time information corresponding to user submissions and/or performance of automated assistant functions, one or more actions performed by the automated assistant or on behalf of the automated assistant in performing the particular automated assistant function, identifiers of client devices used in performing or affected by the performance of the automated assistant function (e.g., client devices that include one or more automated assistant components as well as client devices capable of control via automated assistant, such as Internet of Things ("IoT") devices), any output or parameters determined by or used by the automated assistant during performance the particular automated assistant function, any applications or data used by the automated assistant in performing the particular automated assistant function, and/or any errors determined or received by the automated assistant while attempting performance of the particular automated assistant function.

For example, in the entry for the "play Hypothetical Song" command submitted by a user, the features may include indications of: the content corresponding to the fictional song "Hypothetical Song" (e.g., a song title, a game available on an automated assistant for play, a news update corresponding to the "Hypothetical Song" topic, etc.), the various actions performed by the automated assistant in performing the "play Yesterday" function (e.g., accessing audio or game files stored on the device or at the server, providing a request to a music application, and any searches performed to determine what content to play), any output provided by the automated assistant in performing the particular automated assistant function or informing the user that it was performed, any applications or services with which the automated assistant interfaced during performance of the automated assistant function, any outside information received or retrieved by the automated assistant in identifying or performing the responsive automated assistant function, the client device 106 that relayed the output or information to the user, and the client device affected by the particular automated assistant function or the actions performed during its performance (e.g., the client device that hosted the song or music application, which may be different than the client device 106 that received the user command).

As shown in FIG. 1, an automated assistant failure identification system 134 may be implemented on one or computing devices (which again may be collectively referred to as a "cloud") to enable low-latency identification of potential problems with various automated assistant functions and quick remediation thereof. In some implementations, the automated assistant failure identification system 134 may be operably coupled with one or more of the computing systems that implement automated assistant or the database 101 via one or more local and/or wide area networks (e.g., the Internet) indicated generally at 110. Additionally or alternatively, automated assistant failure identification system 134 may be implemented in whole or in part on the same computing systems that implement the automated assistant or that host the database 101.

The automated assistant failure identification system 134 may use the data contained in the entries of the database 101 to observe the triggering and execution of automated assistant functions, including which commands triggered which automated assistant functions, any detected latency issues, any information used by the automated assistant in identifying/selecting or performing the automated assistant function, any errors received or detected during attempts of performance of the automated assistant functions, and/or any actions or functions attempted or performed responsive to the user submission of the command (e.g., by recognizing one or more entries reflecting that a single user submission of a particular command resulted in a first failed attempt to perform a first automated assistant function followed by a second successful attempt to perform a second automated assistant function).

As shown in FIG. 1, the automated assistant failure identification system 134 may include a golden command engine 136, operable to perform processes such as those described in more detail with respect to FIG. 2, below. The automated assistant failure identification system 134 may further include a stream processing engine 138 and an alert engine 140, operable to perform processes such as those described in more detail with respect to FIG. 3, below.

As described in more detail herein, the automated assistant engages in human-to-computer dialog sessions with one or more users via user interface input and output devices of one or more client devices 106₁ – N. In some implementations, the automated assistant may engage in a human-to-computer dialog session with a user in response to user interface input provided by the user via one or more user interface input devices of one of the client devices 106₁ – N, including user submissions of commands for the automated assistant to perform various automated assistant functions. In some of those implementations, the user interface input is explicitly directed to the automated assistant.

For example, the client portion of the automated assistant 118 may include an automated assistant application with a user interface through which the user may provide various forms of user interface input (e.g., text, spoken utterance, touch input, etc.) to the automated assistant. In some implementations, the client portion of the automated assistant 118 may also respond to user interface input not explicitly directed to a user interface of an automated assistant application installed on the client device 106. For example, an automated assistant client portion 118 at least partially integrated with the client device 106 operating system may be able to detect one or more user interface inputs provided with or after an invocation action performed by the user on the client device 106 (e.g., the automated assistant client portion 118 may detect spoken utterances that are received by the microphone of the client device 106 subsequent to the user providing a long-press to a home button of the client device 106).

The server-based automated assistant components 119 may include a text-to-speech ("TTS") module 116, a speech-to-text ("STT") module 117, and other components that are described in more detail below. In some implementations, one or more of the modules and/or modules of the automated assistant may be omitted, combined, and/or implemented in a component that is separate from the server-based components of the automated assistant 119. In some implementations, to protect privacy, one or more of the server-based components of the automated assistant 119, such as natural language processor 122, TTS module 116, STT module 117, etc., may be implemented at least in part on client devices 106.

STT module 117 may be configured to convert audio captured by automated assistant client 118 into text and/or to other representations or embeddings, e.g., using STT processing techniques. In some implementations, STT module 117 may be configured to leverage the virtually limitless resources of the cloud to convert audio data captured by speech capture module 110 into text, which may then be provided to the natural language processor 122. In some implementations, STT module 117 may convert an audio recording of speech to one or more phonemes, and then convert the one or more phonemes to text. Additionally or alternatively, in some implementations, STT module 117 may employ a state decoding graph. In some implementations, STT module 117 may generate a plurality of candidate textual interpretations of the user's utterance. In some implementations, STT module 117 may weight or bias particular candidate textual interpretations higher than others depending on whether there are other cues detected contemporaneously, e.g., by miscellaneous cues module 112.

Miscellaneous cues module 112 may detect a variety of cues other than audible cues, such as visual cues detected by a vision sensor (not depicted, e.g., a camera or passive infrared sensor) on client device 106. For example, a user could hold up some predetermined number of fingers when issuing a vocal request to the automated assistant, and the number of fingers may be detected as a cue that is used as a parameter for the user's request. These visual cues may include but are not limited to hand gestures, gazes towards particular reference points, facial expressions, predefined movements by users, etc.

Other types of cues that may be detected by module 112 include, but are not limited to, location cues (e.g., from position coordinate sensors), wireless signals (e.g., Bluetooth, Wi-Fi, cellular), and so forth. In some implementations, TTS module 116 may be configured to convert text to computer-synthesized speech, e.g., using one or more voice synthesizers that may be, for instance, selected by a user, selected automated based on a user's region and/or demographics, etc. In some implementations, all or parts of modules 116, 117, and 112 may be implemented on client device 106, in addition to or instead of on the cloud.

The automated assistant may engage in human-to-computer dialog sessions with one or more users via user interface input and output devices of one or more of the client devices 106. In some implementations, the automated assistant may engage in a human-to-computer dialog session with a user in response to user interface input provided by the user via one or more user interface input devices of one of the client devices 106. In some of those implementations, the user interface input is explicitly directed to the automated assistant. For example, a user may verbally provide (e.g., type, speak) a predetermined invocation phrase, such as "OK, Assistant," or "Hey, Assistant," to cause automated assistant 120 to begin actively listening or monitoring typed text. Additionally or alternatively, in some implementations, automated assistant 120 may be invoked based on one or more detected visual cues, alone or in combination with oral invocation phrases.

Natural language processor 122 may be configured to process natural language input generated by user(s) via client device 106 and may generate annotated output (e.g., in textual form) for use by one or more other components of the automated assistant. For example, the natural language processor 122 may process natural language free-form input that is generated by a user via one or more user interface input devices of client device 106. The generated annotated output includes one or more annotations of the natural language input and one or more (e.g., all) of the terms of the natural language input.

In some implementations, the natural language processor 122 is configured to identify and annotate various types of grammatical information in natural language input. For example, the natural language processor 122 may include a morphological module that may separate individual words into morphemes and/or annotate the morphemes, e.g., with their classes. Natural language processor 122 may also include a part of speech tagger configured to annotate terms with their grammatical roles. For example, the part of speech tagger may tag each term with its part of speech such as "noun," "verb," "adjective," "pronoun," etc. Also, for example, in some implementations the natural language processor 122 may additionally and/or alternatively include a dependency parser (not depicted) configured to determine syntactic relationships between terms in natural language input. For example, the dependency parser may determine which terms modify other terms, subjects and verbs of sentences, and so forth (e.g., a parse tree)—and may make annotations of such dependencies.

In some implementations, the natural language processor 122 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. For example, a "banana" node may be connected (e.g., as a child) to a "fruit" node," which in turn may be connected (e.g., as a child) to "produce" and/or "food" nodes. As another example, a restaurant called "Hypothetical Cafe" may be represented by a node that also includes attributes such as its address, type of food served, hours, contact information, etc. The "Hypothetical Cafe" node may in some implementations be connected by an edge (e.g., representing a child-to-parent relationship) to one or more other nodes, such as a "restaurant" node, a "business" node, a node representing a city and/or state in which the restaurant is located, and so forth.

The entity tagger of the natural language processor 122 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 122 may additionally and/or alternatively include a coreference resolver (not depicted) configured to group, or "cluster," references to the same entity based on one or more contextual cues. For example, the coreference resolver may be utilized to resolve the term "there" to "Hypothetical Cafe" in the natural language input "I liked Hypothetical Cafe last time we ate there."

In some implementations, one or more components of the natural language processor 122 may rely on annotations from one or more other components of the natural language processor 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 122 may use related prior input and/or other related data outside of the particular natural language input to determine one or more annotations.

The server-based automated assistant component(s) 119 may further include fulfillment module 124. Fulfillment module 124 may generate fulfillment data using the data generated by the natural language processor 122. Fulfillment module 124 can optionally utilize one or more on-device fulfillment models (not illustrated in FIG. 1 for simplicity) in generating the fulfillment data. This fulfillment data can define local and/or remote responses (e.g., output to provide via the client device 106) to the spoken utterance, interaction(s) to perform with locally installed application(s) based on the spoken utterance, command(s) to transmit to Internet-of-things (IoT) device(s) (directly or via corresponding remote system(s)) based on the spoken utterance, and/or other resolution action(s) to perform based on the spoken utterance. The fulfillment data is then provided for local and/or remote performance/execution of the determined action(s) to resolve the spoken utterance. Execution can include, for example, rendering local and/or remote responses (e.g., visually and/or audibly rendering (via on-device TTS generator 122 using on-device TTS generator model(s) 125A1)), interacting with locally installed applications, transmitting command(s) to IoT device(s), and/or other action(s).

Fulfillment module 124 may use various techniques to determine an intent of the user, e.g., based on output from natural language processor 122 (which may include annotations and terms of the natural language input) and/or based on output from miscellaneous cues module 112. In some implementations, fulfillment module 124 may have access to one or more databases (not depicted) that include, for instance, a plurality of mappings between grammars, other cues, and responsive actions (or more generally, intents). In many cases, these grammars may be selected and/or learned over time, and may represent the most common intents of users. For example, one grammar, "play <artist>", may be mapped to an intent that invokes a responsive action that causes music by the <artist> to be played on the client device 106 operated by the user.

In some implementations, the automated assistant may serve as an intermediary between users and one or more third party computing services (or "third party agents", or "agents"). These third party computing services may be independent software processes that receive input and provide responsive output. Some third party computing services may take the form of third party applications that may or may not operate on computing systems that are separate from those that operate, for instance, the server-based automated assistant components 119. One kind of user intent that may be identified by fulfillment module 124 is to engage a third party computing service. For example, the automated assistant may provide access to an application programming interface ("API") to a service for controlling a smart device. A user may invoke the automated assistant and provide a command such as "I'd like to turn the heating on." Fulfillment module 124 may map this command to a grammar that triggers the automated assistant to engage with the third party service, thereby to cause the user's heating to be switched on. The third party service may provide the automated assistant with a minimum list of slots that need to be filled in order to fulfill (or "resolve") a command to turn the heating on. In this example, the slots may include the temperature to which the heating is to be set, and a duration for which the heating is to be on. The third party service may provide other information, including data useful in generating visual and audible responses to user commands. The automated assistant may generate and provide to the user (via client device 106) natural language output that solicits parameters for the slots.

Fulfillment module 124 may be configured to predict the intent, as well as associated slot values (whether provided by the user proactively or solicited from the user) and fulfill (or "resolve") the intent. In various implementations, fulfillment (or "resolution") of the user's intent may cause various fulfillment information (also referred to as "responsive" information or "resolution information") to be generated/obtained, e.g., by fulfillment module 124. As will be described below, the fulfillment information may in some implementations be provided to a natural language generator 126, which may generate natural language output based on the fulfillment information.

Fulfillment (or "resolution") information may take various forms because an intent can be fulfilled (or "resolved") in a variety of ways. Fulfillment may include triggering a responsive automated assistant function. Responsive automated assistant functions may include, for instance, ordering a good/service, starting a timer, setting a reminder, initiating a phone call, playing media, sending a message, etc. In some such implementations, fulfillment information may include slot values associated with the fulfillment, confirmation responses (which may be selected from predetermined responses in some cases), etc.

Natural language generator 126 may be configured to generate and/or select natural language output (e.g., words/phrases that are designed to mimic human speech) based on data obtained from various sources. In some implementations, natural language generator 126 may be configured to receive, as input, fulfillment information associated with fulfillment of an intent, and to generate natural language output based on the fulfillment information. Additionally or alternatively, natural language generator 126 may receive information from other sources, such as third party applications (e.g., required slots), which it may use to compose natural language output for the user.

Figure 2:
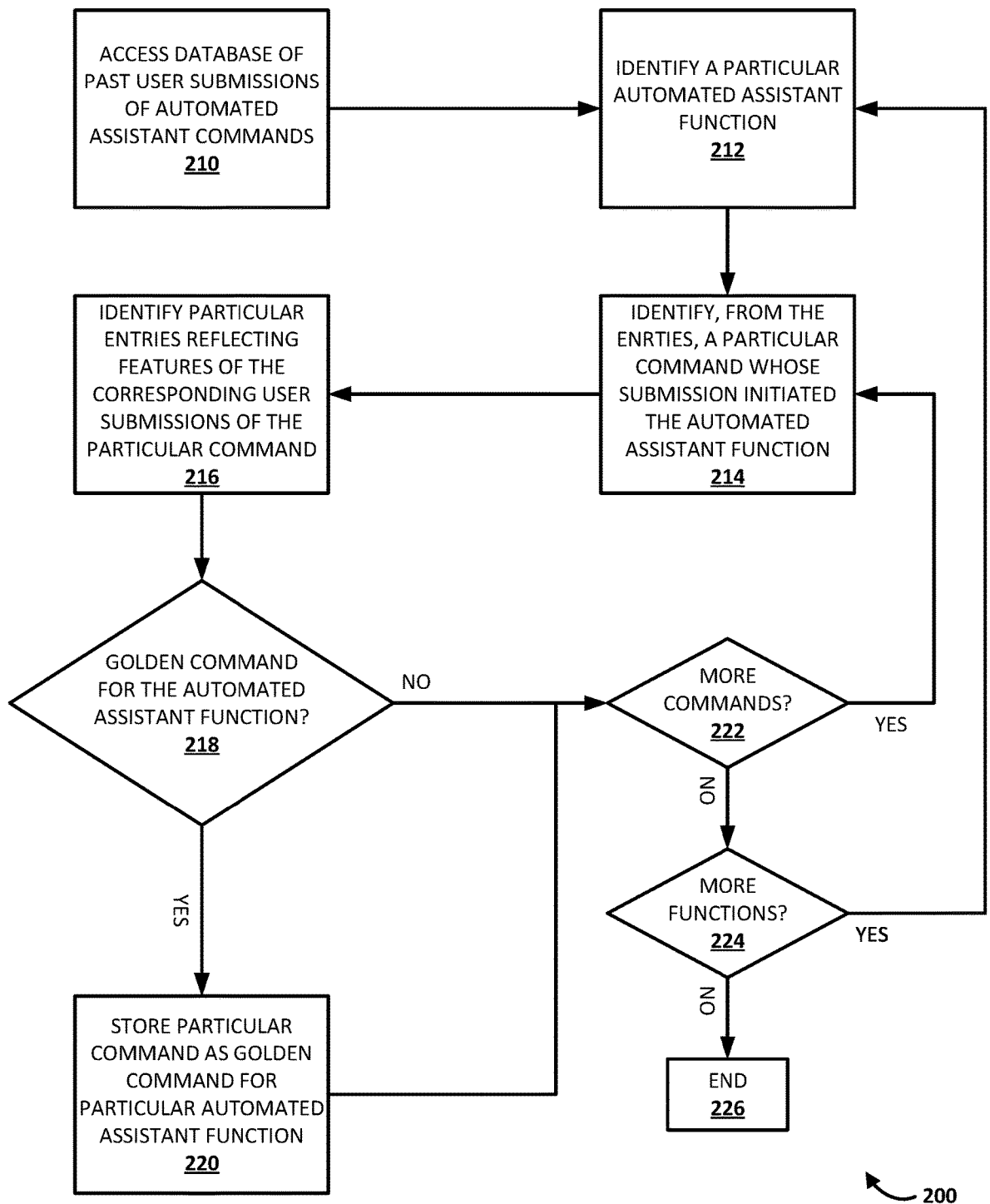
FIG. 2 is a flowchart illustrating an example method of determining corresponding golden commands for each of a plurality of automated assistant functions.

Turning now to FIG. 2, a flowchart illustrating an example method 200 of determining a golden command for a particular automated assistant function. As used herein, a "golden command" can be a particular command determined to always, or nearly always, invoke a particular automated assistant function, absent other overriding considerations such as user-specific settings manipulating the automated assistant functions that will be performed in response to particular commands (e.g., a user has previously told the automated assistant "When I say 'stop', you say 'Hammer Timer!'").

For convenience, the operations of method 200 are described with reference to a system that performs the operations. This system may include one or more of the components of an automated assistant failure identification system 134 communicatively coupled to one or more server-based automated assistant component(s) 119, one or more automated assistant client component(s) 118, and/or a database 101 containing entries each reflecting corresponding features of a corresponding user submission of a particular command and a particular automated assistant function performed in response to or based on the particular command. For example, the golden command engine 136 of the automated assistant failure identification system 134 may perform method 200 and may access database 101 or access the entries of database 101 via network 110 to enable low-latency identification of potential problems with various automated assistant functions. While the operations of the method 200 are shown in a particular order, this is not meant to be limiting. One or more operations may be reordered, omitted, or added.

At block 210, the system can access the database 101 containing entries of past user submissions of automated assistant commands. The entries of the database accessed by the system can include entries reflecting past automated assistant commands submitted within a threshold amount of time relative to a current time. For example, the accessed entries may include entries corresponding to past automated assistant commands submitted within 3 seconds, 30 minutes, 5 days, 1 month, etc. of the current time of the accessing, so that the system will determine current or recent golden commands for particular automated assistant functions. Accessing and analyzing only recent entries will result in golden command(s) being determined, for corresponding automated assistant function(s), that are truly currently golden command(s). Accordingly, current golden commands can be determined even in cases where the golden commands for particular automated assistant functions change over time, for instance due to increased natural language understanding causing the automated assistant to perform new, potentially more specific functions in response to commands that were previously golden commands for other, potentially more general functions, or due to newly developed or launched automated assistant functions better corresponding to the old golden commands for a different automated assistant function.

At block 212, the system can identify or select a particular automated assistant function for analysis. The system can, at block 214, select a particular command to evaluate for golden command status for the automated assistant function by identifying, from the entries of the database 101 that include the particular automated assistant function and that reflect user submissions of commands within a threshold period of time of the current time, entries that reflect user submissions of a particular command whose submission initiated the particular automated assistant function.

At block 216, the system can identify particular entries of the database 101 that reflect corresponding features of user submissions of the particular command. Note that these particular entries may include further entries than those identified at block 214, e.g., entries corresponding to the particular command but which reflect a different automated assistant function performed in response to the particular command. These features may include features of the entries as described above with respect to FIG. 1.

For example, the system can select a particular automated assistant function corresponding to "cancel triggered alarm/timer" at block 212, and identify particular entries showing user submissions of the command "stop [while triggered alarm/timer audio is playing]" (or an acoustic representation thereof) at block 214. In such an example, the features of the entries identified at block 216 may include indications of: the affected alarm or timer (e.g., a user's 6:45 AM alarm, a user's 5 minute timer), the various actions performed by the automated assistant in performing the "cancel triggered alarm/timer" function (e.g., silencing the alarm/timer instantly, slowly decreasing the alarm/timer volume, resetting it to trigger again in the future, canceling the alarm/timer, or deleting the alarm/timer), the various actions performed by the automated assistant in interfacing with associated applications or client devices 106 to direct associated applications to perform certain actions (e.g., interfacing with an alarm or timer application through an application programming interface ("API") and indications of data sent through the API and received in response), any output or in some cases, lack thereof, provided by the automated assistant in performing the particular automated assistant function or informing users that it was performed (e.g., audio output confirming "your alarm/timer has been canceled", indications that audio ceased playing after the particular command was processed), and/or identifiers of client devices 106 interacted with during the performance of the automated assistant function (e.g., alarm application servers and client devices 106 that hosted the alarms).

Based on the features of these particular entries identified at block 216, the system can then determine whether or not the particular command indicated by the entries is a golden command for that particular automated assistant function at block 218. This may include determining that at least a threshold percentage of the user submissions of the particular command included in the entries triggered the particular automated assistant function, and that the quantity of the user submissions of the particular command indicated by the entries satisfies a threshold quantity. In some implementations, this may further include determining that a threshold amount of time has passed since another particular command was determined to be the golden command for the particular automated assistant function.

For example, the system can determine at least 100 particular entries exist for a "set an alarm for X minutes" command, and that at least a threshold percentage of those particular entries indicate that the same automated assistant function was triggered in response. For example, the system at block 218 can determine that at least 95% of the 100 particular entries that indicate a submission of the command "set an alarm for X minutes" by users resulted in the automated assistant setting a timer for X minutes (as opposed to setting an alarm for X:00 AM/PM, providing an error message, or providing output that requests the users specify if they would like to set a timer for X minutes or an alarm for X:00 AM/PM). Likewise, for a "set a timer for X o'clock" command, the system can determine at least 100 particular entries exist and that at least a threshold percentage of those particular entries indicate that a submission of the command "set a timer for X o'clock" by users resulted in the automated assistant setting an alarm for X:00 AM/PM (as opposed to setting a timer for X minutes, providing an error message, or providing output that requests the users specify if they would like to set a timer for X minutes or an alarm for X:00 AM/PM).

If the data included in the particular entries is determined to show that the criteria of block 218 are met, then method 200 proceeds to block 220 where the system stores an indication that the particular command "stop [while triggered alarm audio is playing]" is a golden command for the automated assistant function "cancel triggered alarm" in database 101 or in one or more additional databases accessible to the system.

If the data included in the particular entries is determined to show that one or both of the criteria of block 218 are not met, then method 200 proceeds to block 222 where the system looks for additional particular commands indicated by the entries in the database 101 as triggering the particular automated assistant function of "cancel triggered alarm". This may include determining that the one or more databases storing indications of golden commands for particular automated assistant functions may need to be updated (e.g., based on time since last update or based on conflicting information identified in the one or more databases for one or more of the particular commands). If some are found, then method 200 returns to block 214 to select a particular command to evaluate for golden command status with respect to that particular automated assistant function. If none are found, then method 200 proceeds to block 224 to select another particular automated assistant function for golden command analysis.

At block 224, the system determines if there are more automated assistant functions that may be selected for evaluation by method 200. This may include determining that the one or more databases storing indications of golden commands for particular automated assistant functions do not include indications of golden commands for particular automated assistant functions, or determining that any or all such existing indications in the one or more databases may need to be updated (e.g., based on time since last update or based on conflicting information identified in the one or more databases for one or more of the particular automated assistant functions). If further such automated assistant functions are found, then method 200 moves to block 212 to select one for analysis. If no such further automated assistant functions are found, then method 200 ends at block 226.

Figure 3:
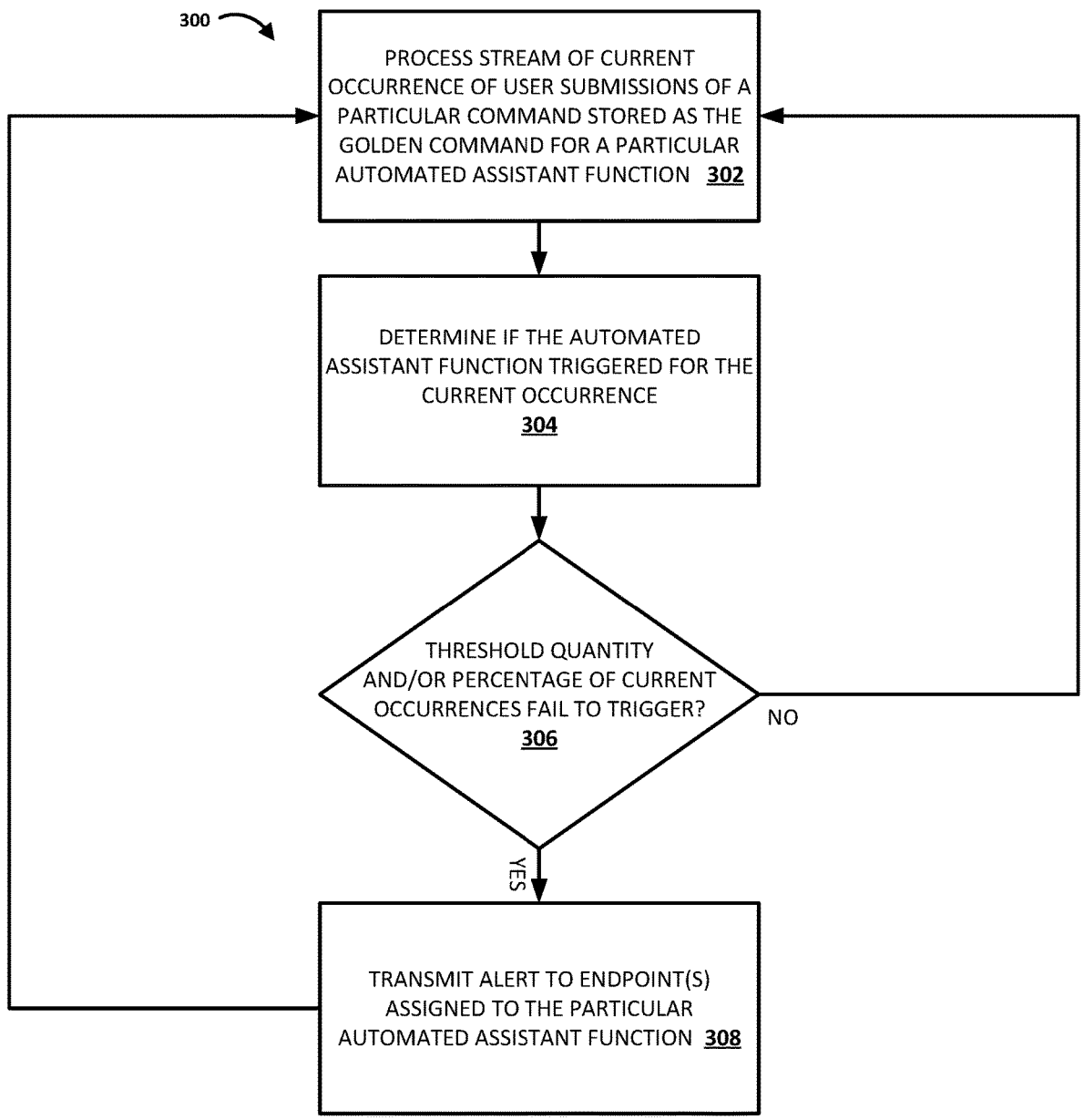
FIG. 3 is a flowchart illustrating an example method of analyzing the performance of golden command(s), for a particular automated assistant function, in triggering the particular automated assistant function.

Turning now to FIG. 3, a flowchart illustrating an example method 300 of analyzing the performance of the golden commands in triggering the particular automated assistant function. While the operations of the method 300 are shown in a particular order, this is not meant to be limiting. One or more operations may be reordered, omitted, or added.

For convenience, the operations of method 300 are described with reference to a system that performs the operations. This system may include one or more the components of an automated assistant failure identification system 134 communicatively coupled to one or more server-based automated assistant component(s) 119, one or more automated assistant client component(s) 118, and/or one or more databases including indications of particular commands that are golden commands for particular automated assistant functions.

For example, the stream processing engine 138 of the automated assistant failure identification system 134 may perform method 300 and may access the database(s) or access the entries of the database(s), via network 110, that include indications of particular commands that are golden commands for particular automated assistant functions, in order to enable low-latency identification of potential problems with various automated assistant functions. In some implementations, the alert engine 140 may be a component of the stream processing engine 138. In some implementations, the stream processing engine 138 and/or one or more other components of the automated assistant failure identification system 134 may perform the entirety of method 300, and the alert engine 140 may be used to store and/or analyze data pertaining to alerts generated by the system in performing method 300, or may provide support data to the system in performing method 300 such as providing corresponding endpoints for the system to alert. While the operations of the method 300 are shown in a particular order, this is not meant to be limiting. One or more operations may be reordered, omitted, or added.

The stream of current occurrences of user submissions of the particular command may be received from one or more of the server-based automated assistant component(s) 119 or automated assistant client component(s) 118, or from one or more additional components communicatively coupled to the server- or client-side automated assistant components 119, 118. The stream of current occurrences of user submissions of the particular command may include intent, entity, and annotation data determined based on natural language processing of the particular command as well as data describing features of the automated assistant response provided based on the particular command. The stream of current occurrences may include all identified user submissions of the particular command received by the automated assistant at or after the particular command is stored in one or more of the databases as a golden command for the particular automated assistant function, or all identified user submissions of the particular command received by the automated assistant at or after the system selects the indication of the particular command as the golden command for review.

At block 304, the system can determine, for each current occurrence of the stream, if the user submission of the particular command caused the performance of the particular automated assistant function. Method 300 then moves to block 306, where the system determines if a threshold quantity and/or percentage of the current occurrences processed have failed to trigger the automated assistant function. This threshold may be selected to reflect a potential problem with that particular automated assistant function such that a pattern of deviation from golden command status for that particular function may be detected without occasional deviations triggering transmissions of alerts to associated endpoints at block 308. For example, the threshold may be selected such that less than 75% of the current occurrences of the user submissions of the particular command successfully triggering the particular automated assistant function will trigger an alert. As another example, the threshold may be selected such that 300 current occurrences of failure will trigger an alert. In some implementations, the threshold may be different for different particular commands and/or different particular automated assistant functions. For instance, a lower quantity and/or percentage of failures of particular commands that are short or that have been indicated as golden commands for a long time period may trigger an alert than the quantity and/or percentage necessary to trigger an alert when the particular command is long or has been newly indicated as a golden command.

By processing current occurrences of user submissions of a particular command that is a golden command for a particular automated assistant function and transmitting alerts to the endpoints associated with the particular command/function, the system minimizes the amount of downtime or affected performance of the particular command/function for users of the automated assistant. One or more development teams may be alerted via their corresponding endpoints to issues with particular commands/functions in real-time, or near real-time, as these issues are experienced by the multiple affected users of the automated assistant system. Moreover, computational and network resources can be conserved as the development teams associated with the one or more alerted endpoints can identify and rectify issues with particular commands/functions in near real-time without waiting until the automated assistant generates an error report and/or enough users submit negative feedback to trigger a command/function review.

In some implementations, a second, higher threshold may additionally or alternatively be used to detect a definite problem with a particular command and/or automated assistant function. When this second, higher threshold indicates a definite problem is present, an alert can be transmitted at block 308 to the associated endpoints for the particular command/function, and an alert may likewise be sent to one or more components of the automated assistant to cause the automated assistant to disable the particular function for potentially affected client devices, or for all client devices.

By disabling the particular function for the potentially affected client devices, both computational and network resources can be conserved. For example, by using the techniques described herein in detecting and verifying the occurrence of automated assistant function failure events in the ecosystem, components and/or functionalities of an automated assistant may be kept dormant when, absent these techniques, may have been activated even though they were not intended to be activated. As another example, further alerts or data describing negative user feedback sent to endpoints associated with the particular command and/or particular automated assistant function can be suppressed when, absent this technique, they may have been sent repeatedly when development teams associated with those endpoints have already been notified and may be working on a solution.

At block 306, if the processed current occurrences do not indicate a threshold quantity and/or percentage of failures of the particular command in triggering the particular automated assistant function, then method 300 returns to block 302 to process more incoming current occurrences. If, at block 306, if the processed current occurrences do indicate a threshold quantity and/or percentage of failures of the particular command in triggering the particular automated assistant function, then method 300 proceeds to block 308 to transmit an alert to the endpoints associated with the various development teams involved in processing the particular command and/or fulfilling the particular automated assistant function. These endpoints may include, for example, a phone number, an email address, or a mobile device identifier known to be associated with a development team. In some implementations, method 300 may include interfacing with one or more components of the automated assistant to deliver the alerts to the development teams, e.g., through a developer-monitored communication portal component.

This alert may include information necessary to assist the development teams in repairing or managing the failures of the automated assistant function, such as indications of the automated assistant function that was actually triggered or indications of actions attempted by the automated assistant in performing the particular automated assistant function that may have failed.

As shown in FIG. 3, once the associated endpoints have been notified, method 300 can move to block 302 to continue processing current occurrences and potentially further alerting the endpoints based on the processing. Method 300 may thus continue for as long as the particular command is indicated as the golden command for that particular automated assistant function. In some implementations, one or more of the development teams associated with the endpoints that received the alert(s) may modify or remove this indication. In some implementations, this indication may be modified or removed by one or more of the components of the system upon a threshold number of alerts issued. In some implementations, one or more of the components of the system may prevent further alerts from being transmitted to the endpoints associated with the development teams after a threshold number of alerts have been transmitted, but may otherwise continue to allow the alerts to be generated and method 300 to continue.

Figure 4:
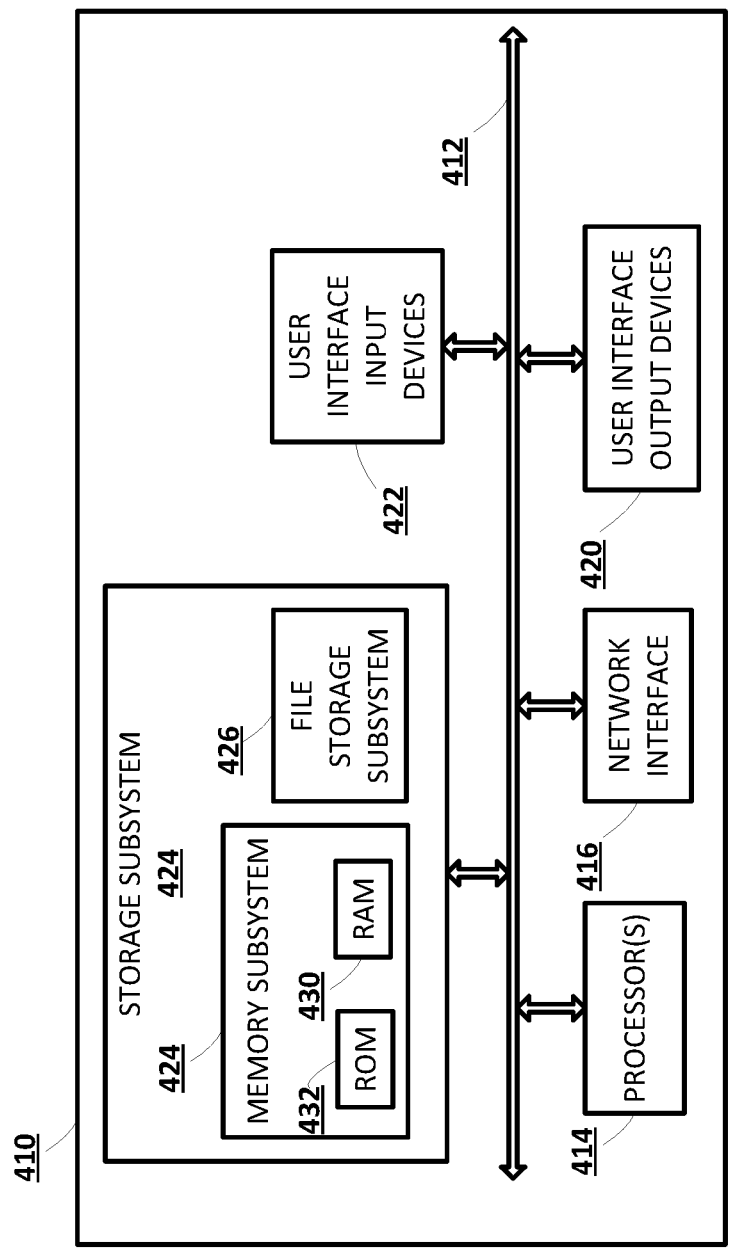
FIG. 4 depicts an example architecture of a computing device.

FIG. 4 is a block diagram of an example computing device 410 that may optionally be utilized to perform one or more aspects of techniques described herein. In some implementations, one or more of a client device, cloud-based automated assistant component(s), and/or other component(s) may comprise one or more components of the example computing device 410.

Computing device 410 typically includes at least one processor 414 which communicates with a number of peripheral devices via bus subsystem 412. These peripheral devices may include a storage subsystem 424, including, for example, a memory subsystem 424 and a file storage subsystem 426, user interface output devices 420, user interface input devices 422, and a network interface subsystem 416. The input and output devices allow user interaction with computing device 410. Network interface subsystem 416 provides an interface to outside networks and is coupled to corresponding interface devices in other computing devices.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 410 to the user or to another machine or computing device.

Storage subsystem 424 stores programming and data constructs that provide the functionality of some or all of the modules described herein. For example, the storage subsystem 424 may include the logic to perform selected aspects of the methods disclosed herein, as well as to implement various components depicted in FIG. 1.

These software modules are generally executed by processor 414 alone or in combination with other processors. The memory subsystem 424 included in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computing device 410 communicate with each other as intended. Although bus subsystem 412 is shown schematically as a single bus, alternative implementations of the bus subsystem may use multiple busses.

Computing device 410 can be of varying types including a workstation, server, computing cluster, blade server, server farm, or any other data processing system or computing device. Due to the ever-changing nature of computers and networks, the description of computing device 410 depicted in FIG. 4 is intended only as a specific example for purposes of illustrating some implementations. Many other configurations of computing device 410 are possible having more or fewer components than the computing device depicted in FIG. 4.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising
    determining that a particular command is currently a golden command for a particular automated assistant function, wherein determining that the particular command is currently the golden command for the particular automated assistant function comprises:
        identifying particular entries that each reflect corresponding features of a corresponding user submission of the particular command, the identifying being from a database of entries reflecting past automated assistant commands submitted within a threshold amount of time relative to a current time,
        determining, based on the features of the particular entries, that:
            at least a threshold percentage of the user submissions of the particular command triggered the particular automated assistant function, and
            a quantity of the user submission of the particular command satisfies a threshold quantity, and
        determining that the particular command is currently the golden command responsive to determining that (a) at least the threshold percentage of the user submissions triggered the particular automated assistant function and (b) the quantity satisfies the threshold quantity;
    responsive to determining that the particular command is currently the golden command:
        processing a stream of current occurrences of submissions of the particular command to determine, for each of the current occurrences, whether the particular automated assistant function is triggered; and
        when the processing indicates that a threshold quantity and/or percentage of the current occurrences fails to satisfy a potential problem threshold:
            causing one or more electronic alerts to be transmitted to one or more endpoints that are assigned to the particular automated assistant function, wherein the one or more electronic alerts each indicate there is a potential problem with one or both of the particular command and the particular automated assistant function.

2. The method of claim 1, wherein the particular command comprises one or more particular terms.

3. The method of claim 1, wherein the particular command comprises one or more particular terms paired with one or both of: (i) a device context of an associated assistant device, that received the particular command, when the particular command was submitted and (ii) an environmental context of an environment when the particular command was submitted.

4. The method of claim 3, wherein the device context comprises an indication of content being rendered by the associated assistant device.

5. The method of claim 4, wherein the content is audible content being audibly rendered by the associated assistant device.

6. The method of claim 3, wherein the environmental context comprises one or both of:
    a temporal context, and
    additional device(s) context that indicates one or more states of one or more additional devices linked with the associated assistant device.

7. The method of claim 1, wherein the one or more endpoints comprise a phone number, an email address, or a mobile device identifier.

8. The method of claim 7, further comprising,
    when the processing indicates that the threshold quantity and/or percentage of the current occurrences fails to satisfy the potential problem threshold, or a definite problem threshold that is more strict than the potential problem threshold:
    disabling the particular automated assistant feature for a plurality of automated assistant devices.

9. The method of claim 1, further comprising:
    determining that a second particular command is currently a second golden command for the particular automated assistant function; and
    responsive to determining that the particular command is currently the golden command:
        processing a stream of current occurrences of submissions of the particular command and of submissions of the second particular command to determine, for each of the current occurrences, whether the particular automated assistant function is triggered; and when the processing indicates that a threshold quantity and/or percentage of the current occurrences of the submissions of the particular command or the second particular command fails to satisfy a potential problem threshold:

causing one or more electronic alerts to be transmitted to one or more endpoints that are assigned to the particular automated assistant function, wherein the one or more electronic alerts each indicate there is a potential problem with one or both of the particular command, the second particular command, and the particular automated assistant function.

10. The method of claim 1, wherein determining that the particular command is currently the golden command for the particular automated assistant function occurs responsive to determining that a threshold duration of time has passed since one or more current golden commands were determined for the particular assistant function.

11. The method of claim 1, wherein the particular automated assistant function comprises controlling one or more internet of things (IoT) devices.

12. The method of claim 1, wherein the particular automated assistant function comprises setting a timer, stopping a sounding timer, playing music, setting an alarm, or stopping a sounding alarm.

13. A system comprising:
a processor;
a memory in communication with the processor, wherein the memory stores instructions that, in response to execution of the instructions by the processor, cause the processor to:
determine that a particular command is currently a golden command for a particular automated assistant function, wherein determining that the particular command is currently the golden command for the particular automated assistant function comprises:
identify particular entries that each reflect corresponding features of a corresponding user submission of the particular command, the identifying being from a database of entries reflecting past automated assistant commands submitted within a threshold amount of time relative to a current time,
determine, based on the features of the particular entries, that:
at least a threshold percentage of the user submissions of the particular command triggered the particular automated assistant function, and
a quantity of the user submission of the particular command satisfies a threshold quantity, and
determine that the particular command is currently the golden command responsive to determining that (a) at least the threshold percentage of the user submissions triggered the particular automated assistant function and (b) the quantity satisfies the threshold quantity;
responsive to determining that the particular command is currently the golden command:
process a stream of current occurrences of submissions of the particular command to determine, for each of the current occurrences, whether the particular automated assistant function is triggered; and
when the processing indicates that a threshold quantity and/or percentage of the current occurrences fails to satisfy a potential problem threshold:
cause one or more electronic alerts to be transmitted to one or more endpoints that are assigned to the particular automated assistant function, wherein the one or more electronic alerts each indicate there is a potential problem with one or both of the particular command and the particular automated assistant function.

14. The system of claim 13, wherein the particular command comprises one or more particular terms.

15. The system of claim 13, wherein the particular command comprises one or more particular terms paired with one or both of: (i) a device context of an associated assistant device, that received the particular command, when the particular command was submitted and (ii) an environmental context of an environment when the particular command was submitted.

16. The system of claim 15, wherein the device context comprises an indication of content being rendered by the associated assistant device.

17. The system of claim 16, wherein the content is audible content being audibly rendered by the associated assistant device.

18. The system of claim 15, wherein the environmental context comprises one or both of:
a temporal context, and
additional device(s) context that indicates one or more states of one or more additional devices linked with the associated assistant device.

19. The system of claim 13, wherein, in response to execution of the instructions by the processor, the processor is further to:
determine that a second particular command is currently a second golden command for the particular automated assistant function; and
responsive to determining that the particular command is currently the golden command:
process a stream of current occurrences of submissions of the particular command and of submissions of the second particular command to determine, for each of the current occurrences, whether the particular automated assistant function is triggered; and
when the processing indicates that a threshold quantity and/or percentage of the current occurrences of the submissions of the particular command or the second particular command fails to satisfy a potential problem threshold:
cause one or more electronic alerts to be transmitted to one or more endpoints that are assigned to the particular automated assistant function, wherein the one or more electronic alerts each indicate there is a potential problem with one or both of the particular command, the second particular command, and the particular automated assistant function.

20. The system of claim 13, wherein the particular automated assistant function comprises controlling one or more internet of things (IoT) devices.

* * * * *